United States Patent
Beck et al.

(10) Patent No.: US 11,153,665 B2
(45) Date of Patent: Oct. 19, 2021

(54) SYSTEMS AND METHODS FOR CONTROLLING DISPLAY OF SUPPLEMENTARY DATA FOR VIDEO CONTENT

(71) Applicant: The Toronto-Dominion Bank, Toronto (CA)

(72) Inventors: Jeffrey Lee Beck, Toronto (CA); Philip P. Clarkin, Toronto (CA); Jeffrey John Wojcicki, Toronto (CA); Ravi Rampersad, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 16/802,072

(22) Filed: Feb. 26, 2020

(65) Prior Publication Data

US 2021/0266650 A1 Aug. 26, 2021

(51) Int. Cl.
*H04N 21/84* (2011.01)
*H04N 21/845* (2011.01)
(Continued)

(52) U.S. Cl.
CPC ..... *H04N 21/8456* (2013.01); *G06F 16/7837* (2019.01); *G06F 16/7844* (2019.01); *G06F 16/7867* (2019.01)

(58) Field of Classification Search
CPC ............ H04N 21/8456; G06F 16/7844; G06F 16/7837; G06F 16/7867
See application file for complete search history.

(56) References Cited

U.S. PATENT DOCUMENTS 7,870,592 B2 1/2011 Hudson et al.
8,689,103 B2 4/2014 Lindley et al.
(Continued)

FOREIGN PATENT DOCUMENTS

WO 2018104834 A1 6/2018

OTHER PUBLICATIONS

Looms: "Sync-by-CBA: Using Metadata for Content-Based Associations to Facilitate Logically Synchronized and Adaptive Multimedia Presentations", Located via Proquest May 19, 2002.
(Continued)

*Primary Examiner* — Girumsew Wendmagegn
(74) *Attorney, Agent, or Firm* — Rowand LLP

(57) ABSTRACT

A processor-implemented method is disclosed. The method includes: receiving, from a media data source, video data associated with a video; obtaining metadata from the received video data, the metadata including text associated with video content of the video; identifying one or more tradeable objects associated with the video based on the metadata; determining one or more segments of the video corresponding to the one or more identified tradeable objects, the one or more video segments having respective playback start timestamps; generating, for display on a client device, one or more user interface elements corresponding to the one or more video segments, the one or more user interface elements being selectable to initiate playback of the respective video segments; receiving, via the client device during playback of the video, a first user input selecting a user interface element corresponding to a first one of the video segments; in response to receiving the first user input: generating supplementary display data associated with a first tradeable object corresponding to the first video segment; and sending, to the client device, the supplementary display data.

20 Claims, 9 Drawing Sheets

(51) Int. Cl.
    *G06F 16/783*    (2019.01)
    *G06F 16/78*     (2019.01)

(56) References Cited

U.S. PATENT DOCUMENTS

| | | |
|---|---|---|
| 8,886,576 B1 | 11/2014 | Sanketi et al. |
| 9,275,499 B2 | 3/2016 | Adhikari et al. |
| 10,198,152 B2 | 2/2019 | Lewis et al. |
| 10,354,425 B2 | 7/2019 | Yan et al. |
| 10,409,862 B2 | 9/2019 | Maharajh et al. |
| 2006/0015925 A1* | 1/2006 | Logan .................. H04N 7/163 |
| | | 725/135 |
| 2006/0230073 A1 | 10/2006 | Gopalakrishnan |
| 2007/0208751 A1 | 9/2007 | Cowan et al. |
| 2013/0006759 A1 | 1/2013 | Srivastava et al. |
| 2013/0311595 A1 | 11/2013 | Milatinovici et al. |
| 2015/0213001 A1 | 7/2015 | Levy et al. |
| 2016/0198239 A1 | 7/2016 | Shenkler et al. |
| 2019/0124403 A1 | 4/2019 | Favicchio et al. |
| 2019/0306519 A1 | 10/2019 | Chen et al. |

OTHER PUBLICATIONS

Liangjun: "Big Video: Key to digital transformation and much more", Located via Proquest Jul. 7, 2017.

\* cited by examiner

SYSTEMS AND METHODS FOR CONTROLLING DISPLAY OF SUPPLEMENTARY DATA FOR VIDEO CONTENT

TECHNICAL FIELD

The present disclosure relates to digital media platforms and, in particular, to systems and methods for providing dynamic video content and related supplementary data.

BACKGROUND

Various online media platforms, such as YouTube™, Twitch™, etc., which enable sharing and streaming of video content are known. Users of such platforms can browse and search for videos, play back video content, and interact with videos (e.g. rate, share, or comment on videos). Video content may be consumed "on-demand"—users can access content, such as pre-recorded videos and live video streams, instantly upon making a selection from a catalogue of available media.

Users of a video platform may wish to obtain additional information that complements their consumption of videos on the platform. For example, a knowledge sharing or research platform may offer videos that cover a number of topics, and users of the platform may wish to read up on or conduct background research relating to subject matter that is presented in the videos. The additional information may be obtained independently of the video platform by, for example, searching for related content in a separate medium (e.g. a new browser window). This type of action disrupts the user's video viewing experience. Moreover, a manual search by the user may not yield the information that the user is particularly interested in about the subject matter covered in the video.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
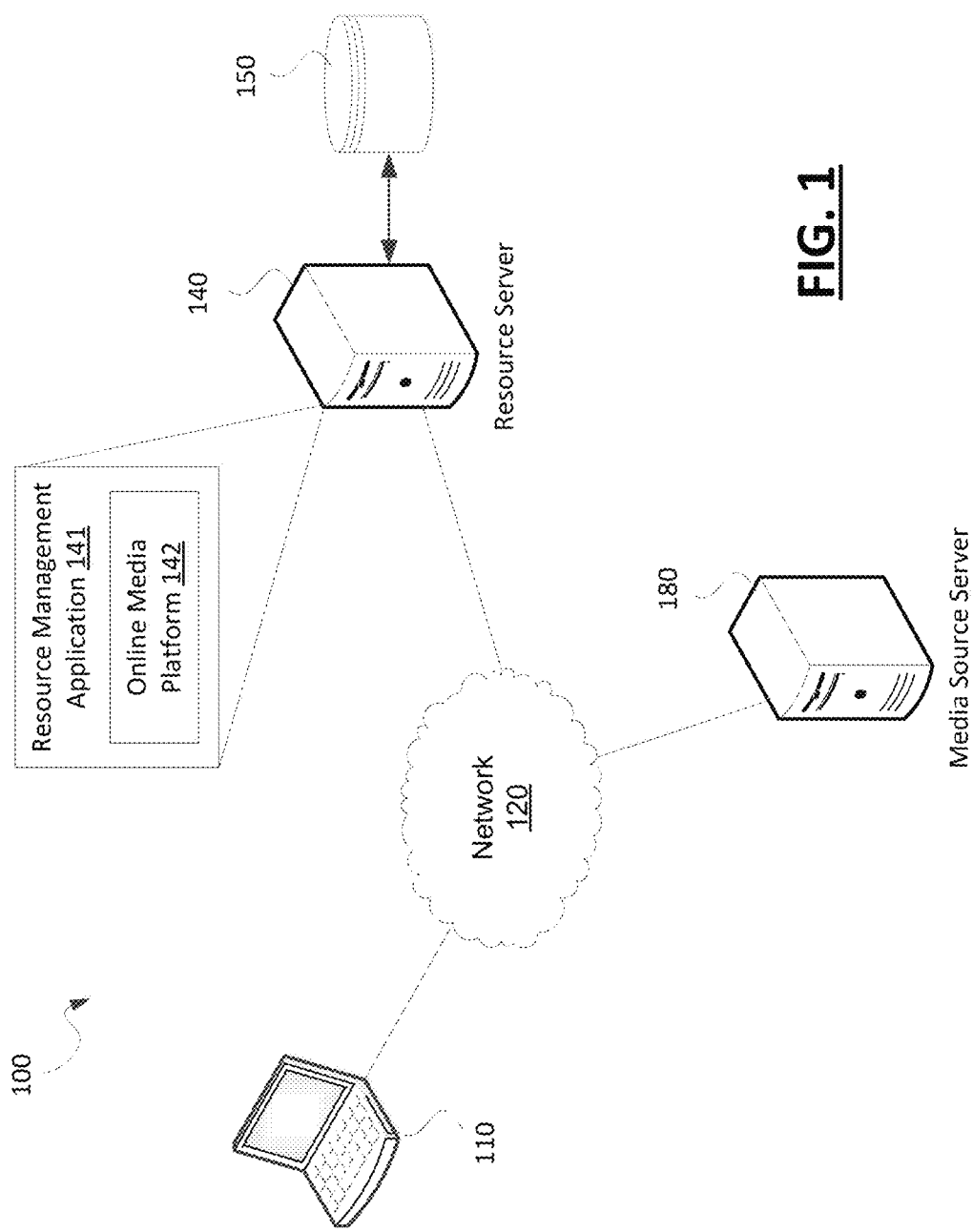
FIG. 1 is a schematic operation diagram illustrating an operating environment of an example embodiment.

In an aspect, the present disclosure describes a computer system. The computer system includes a communications module communicable with an external network, a memory, and a processor coupled to the communications module and the memory. The processor is configured to: receive, from a media data source, video data associated with a video; obtain metadata from the received video data, the metadata including text associated with video content of the video; identify one or more tradeable objects associated with the video based on the metadata; determine one or more segments of the video corresponding to the one or more identified tradeable objects, the one or more video segments having respective playback start timestamps; generate, for display on a client device, one or more user interface elements corresponding to the one or more video segments, the one or more user interface elements being selectable to initiate playback of the respective video segments; receive, via the client device during playback of the video, a first user input selecting a user interface element corresponding to a first one of the video segments; in response to receiving the first user input: generate supplementary display data associated with a first tradeable object corresponding to the first video segment; and send, to the client device, the supplementary display data.

In some implementations, the supplementary display data may comprise graphical user interface data associated with the first tradeable object for displaying on the client device.

In some implementations, generating the supplementary display data comprises: querying a database to retrieve data associated with the first tradeable object; and generating display data based on the retrieved data associated with the first tradeable object.

In some implementations, the text may correspond to at least one of audio or closed captioning text associated with the video content.

In some implementations, the processor may be further configured to: receive, via the client device during playback of the video, a second user input selecting the user interface element; and in response to receiving the second user input, cause the client device to begin playing a video segment corresponding to the user interface element without generating the supplementary display data.

In some implementations, the processor may be further configured to store, in the memory, identities of the tradeable objects in association with playback start timestamps of their corresponding video segments.

In some implementations, the processor may be further configured to: obtain supplementary display data associated with the identified tradeable objects; and store, in the memory, the obtained supplementary display data in association with the identities of the respective tradeable objects.

In some implementations, the processor may be further configured to: for at least one of the identified tradeable objects: determine that current data associated with the at least one identified tradeable object is different from supplementary display data stored in association with the at least one identified tradeable object; and update the memory to store the current data associated with the at least one identified tradeable object.

In some implementations, the processor may be further configured to, during playback of the video, update display of one of the user interface elements which corresponds to a current playback position of the video.

In some implementations, the one or more user interface elements may be displayed, on the client device, concurrently with the video, the one or more user interface elements being displayed at positions corresponding to their respective playback start timestamps.

In another aspect, the present disclosure describes a processor-implemented method. The method includes: receiving, from a media data source, video data associated with a video; obtaining metadata from the received video data, the metadata including text associated with video content of the video; identifying one or more tradeable objects associated with the video based on the metadata; determining one or more segments of the video corresponding to the one or more identified tradeable objects, the one or more video segments having respective playback start timestamps; generating, for display on a client device, one or more user interface elements corresponding to the one or more video segments, the one or more user interface elements being selectable to initiate playback of the respective video segments; receiving, via the client device during playback of the video, a first user input selecting a user interface element corresponding to a first one of the video segments; in response to receiving the first user input: generating supplementary display data associated with a first tradeable object corresponding to the first video segment; and sending, to the client device, the supplementary display data.

In another aspect, the present disclosure describes a computer system. The computer system includes a communications module communicable with an external network, a memory, and a processor coupled to the communications module and the memory. The processor is configured to: obtain user account data identifying one or more tradeable objects associated with an entity and a resource allocation profile in connection with the one or more tradeable objects; receive, from at least one media data source, video data for one or more videos, the video data including content indicator tags associated with the one or more videos; identify a first subset of the one or more videos based on: comparing the content indicator tags associated with the one or more videos with identifying information associated with the one or more tradeable objects; and selecting videos for inclusion in the first subset based on the comparing and the user preferences; and send, to the client device, an indication of the first subset of videos for display in a user interface on the client device.

In some implementations, obtaining the user account data may comprise querying a database to retrieve identities of tradeable objects contained in a virtual portfolio associated with the entity.

In some implementations, the processor may be further configured to: detect a change in the virtual portfolio associated with the entity; and in response to detecting the change, identify a second subset of the one or more videos and sending, to the client device, an indication of the second subset of videos for display in the user interface on the client device.

In some implementations, the comparing may comprise, for at least one of the one or more videos, identifying matches between the content indicators tags associated with the at least one video and the identifying information associated with the tradeable objects represented in the at least one video.

In some implementations, selecting the videos for inclusion in the first subset may comprise determining a count of matches between the content indicators tags associated with the at least one video and the identifying information associated with the tradeable objects represented in the at least one video.

In some implementations, selecting videos for inclusion in the first subset comprises: computing relevance scores for the one or more videos, the relevance scores measuring similarity between the content indicator tags and the identifying information associated with the one or more tradeable objects; and selecting the videos of the first subset based on the computed values of the relevance scores.

In some implementations, the processor may be further configured to assign, to at least one of the videos of the first subset, a priority index representing a priority of displaying the at least one video in a listing of videos on the client device, the priority index being determined based on the comparison.

In some implementations, the processor may be further configured to: determine a personalized ranking of the one or more videos of the first subset based on the priority indices associated with the one or more videos of the first subset; and send the personalized ranking to the client device.

In some implementations, the processor may be further configured to: receive video data for a first video not included in the first subset; determine that a relevance score for the first video is greater than a relevance score for at least one of the videos of the first subset; in response to the determining, send, to the client device, an indication of the first video and identities of the at least one video of the first subset having a lower relevance score than the first video.

In some implementations, the resource allocation profile may comprise an investment risk profile indicating a risk tolerance associated with the entity for at least one of the one or more tradeable objects.

In another aspect, the present disclosure describes a processor-implemented method. The method includes: obtaining user account data identifying one or more tradeable objects associated with an entity and a resource allocation profile in connection with the one or more tradeable objects; receiving, from at least one media data source, video data for one or more videos, the video data including content indicator tags associated with the one or more videos; identifying a first subset of the one or more videos based on: comparing the content indicator tags associated with the one or more videos with identifying information associated with the one or more tradeable objects; and selecting videos for inclusion in the first subset based on the comparing and the user preferences; and sending, to the client device, an indication of the first subset of videos for display in a user interface on the client device.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application discloses an online media platform. The online media platform provides access to a catalogue of one or more videos which are curated for individual users. The video content that is provided to a user via the online media platform may be customized based on user-specific criteria. In accordance with embodiments of the present disclosure, videos can be curated for a user based on the user's account data identifying one or more tradeable objects, such as securities or commodities, that are associated with the user and a resource allocation profile in connection with those tradeable objects. The online media platform selects videos that are relevant for the user, based on the user's account data and resource allocation profile, and the selected videos are presented to the user via a graphical user interface associated with the online media platform. For example, the online media platform may be provided as a component of a digital portfolio management application that allows users to monitor, edit, and conduct research relating to a digital portfolio of tradeable objects. A graphical user interface of the digital portfolio management application may provide a personalized selection of videos for a user, allowing the user to access the selected videos.

The present application discloses techniques for curating videos. A personalized selection of videos for a user can be made, based on user-specific account data. More particularly, a set of preferred videos can be selected from a database of videos, based on account data identifying one or more tradeable objects associated with an entity (e.g. the user) and a resource allocation profile in connection with those tradeable objects. The tradeable objects may, for example, be contained in a digital portfolio associated with the user. The set of preferred videos is identified based on comparing the video content of videos in the database with identifying information associated with the one or more tradeable objects. Specifically, content indicator tags associated with the videos are compared to information relating to the tradeable objects in order to determine content similarity or matches. The preferred videos are selected based on this comparison and the resource allocation profile associated with the tradeable objects.

The present application discloses techniques for displaying supplementary data associated with a video. Specifically, techniques are described for displaying supplementary information relating to the content of a video concurrently with play back of the video on a client device. The metadata for a video contains information about the video content. Specifically, a video's metadata can be analyzed to identify one or more tradeable objects that are associated with the video. Video segments which correspond to the identified tradeable objects are determined, where each video segment has a respective playback start timestamp. A graphical user interface for play back of the video can indicate the segments of the video. In particular, user interface elements corresponding to the video segments can be generated for display on the client device. The user interface elements can be selected to initiate playback of the respective video segments. Upon receiving a user input selecting one of the user interface elements, supplementary display data associated with a tradeable object corresponding to the selected video segment is generated and sent to the client device for display thereon.

FIG. 1 is a schematic diagram of an exemplary operating environment in accordance with embodiments of the present disclosure. FIG. 1 illustrates exemplary components of a system 100, including one or more client devices 110, a resource server 140, a protected data resource 150, and at least one media source server 180. The components of system 100 may be configured to provide, in conjunction, various functionalities associated with an online media platform. More particularly, the system 100 may provide an online video platform (or application, portal, etc.) containing video content that can be accessed using a client device 110. The video content is selectively presented via the online platform such that users can access videos from the media servers 180 that are most relevant or of interest to them.

As illustrated, a resource server 140 and client device 110 communicate via the network 120. The client device 110 is a computing device that may be associated with an entity, such as a user or client, having resources associated with the resource server 140 and/or the protected data resource 150. For example, the resource server 140 may track, manage, maintain, and/or lend resources to the entity. The resources may, for example, be computing resources, such as memory or processor cycles. By way of further example, the resources may comprise stored value, such as fiat currency, which may be represented in the protected data resource 150.

The resource server 140 is coupled to the protected data resource 150, which may be provided in secure storage. The secure storage may be provided internally within the resource server 140 or externally. In some embodiments, the secure storage may be provided remotely from the resource server 140. For example, the secure storage may include one or more data centers. The data centers may, for example, store data with bank-grade security.

The protected data resource 150 stores secure data. In particular, the protected data resource 150 may include records for accounts that are associated with various entities. That is, the secure data may comprise account data for one or more specific entities. For example, an entity that operates the client device 110 may be associated with an account having one or more records in the protected data resource 150. In at least some embodiments, the records may reflect a quantity of stored resources that are associated with an entity. Such resources may include owned resources and/or borrowed resources (e.g. resources available on credit). The quantity of resources that are available to or associated with an entity may be reflected by a balance defined in an associated record.

For example, the secure data in the protected data resource 150 may include financial data, such as banking data (e.g. bank balance, historical transactions data, etc.) and investment data (e.g. portfolio information) for an entity. In particular, the resource server 140 may be a financial institution (e.g. bank) server and the entity may be a customer of the financial institution which operates the financial institution server. The financial data may, in some embodiments, include processed or computed data such as, for example, an average balance associated with an account, an average spending amount associated with an account, a total spending amount over a period of time, or other data obtained by a processing server based on account data for the entity.

In some embodiments, the protected data resource 150 may be a computer system that includes one or more database servers, computer servers, and the like. In some embodiments, the protected data resource 150 may comprise an application programming interface (API) for a web-based system, operating system, database system, computer hardware, or software library.

As shown in FIG. 1, the resource server 140 may administer a resource management application 141. For example, the resource server 140 may be a back-end server associated with an application that allows users to manage various resources. In some embodiments, the resource management application 141 may be a portfolio management software. The portfolio management software may enable users to, among others, conduct investment research, enter and execute trade orders, obtain market quotes, and manage one or more investment accounts. In particular, the portfolio management software can be used to manage users' holdings of tradeable objects, such as stocks, bonds, and commodities.

It will be understood that the resource management application 141 may be administered by a server that is different from the resource server 140. For example, an application server 145 (not shown in FIG. 1) that is independent of resource server 140 may provide back-end services associated with the resource management application 141.

The resource management application 141 may access user data that is stored in the protected data resource 150. For example, a user's financial data may be pulled from the protected data resource 150. The user's financial data may be consolidated (e.g. total amount of the user's investments and cash holdings) and the consolidated data may be provided to the user via the resource management application 141.

The resource management application 141 integrates an online media platform 142. Various different media (e.g. videos, audio recordings, etc.) may be presented via the resource management application 141, and the online media platform 142 facilitates the presentation of the media. In particular, the online media platform 142 may be configured to curate video content from multiple different media sources, and provide personalized selections of videos to users of the resource management application 141. The content of the videos may cover, for example, topics and subject matter which relate to the resources (e.g. holdings of tradeable objects) that users can manage using the resource management application 141.

The resource management application 141 is accessible on the client device 110. For example, the resource management application 141 may be provided via a web interface that can be accessed using a web browser on the client device 110. Additionally, or alternatively, the resource management application 141 may be an application, different from a web browser, operating on the client device 110. For example, the resource management application 141 may be stored in memory of the client device 110 and executed thereon.

The system 100 includes at least one media source server 180. A media source server 180 may be associated with a third-party service which provides media content to one or more different computer systems. Specifically, a media source server 180 may transmit video content to one or more computing devices which request the content. A media source server 180 may host videos locally. Additionally, or alternatively, a media source server 180 may obtain video data from remote sources and transmit the video data to requesting computing devices.

As illustrated in FIG. 1, the media source server 180 may be connected to the client device 110 and the resource server 140 via the network 120. The client device 110, the resource server 140, and the media source server 180 may be in geographically disparate locations. Put differently, the client device 110 may be remote from one or both of the resource server 140 and the media source server 180.

The client device 110, the resource server 140, and the media source server 180 are computer systems. The client device 110 may take a variety of forms including, for example, a mobile communication device such as a smartphone, a tablet computer, a wearable computer (e.g. head-mounted display, smartwatch, etc.), a laptop or desktop computer, or a computing device of another type.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

Figure 2:
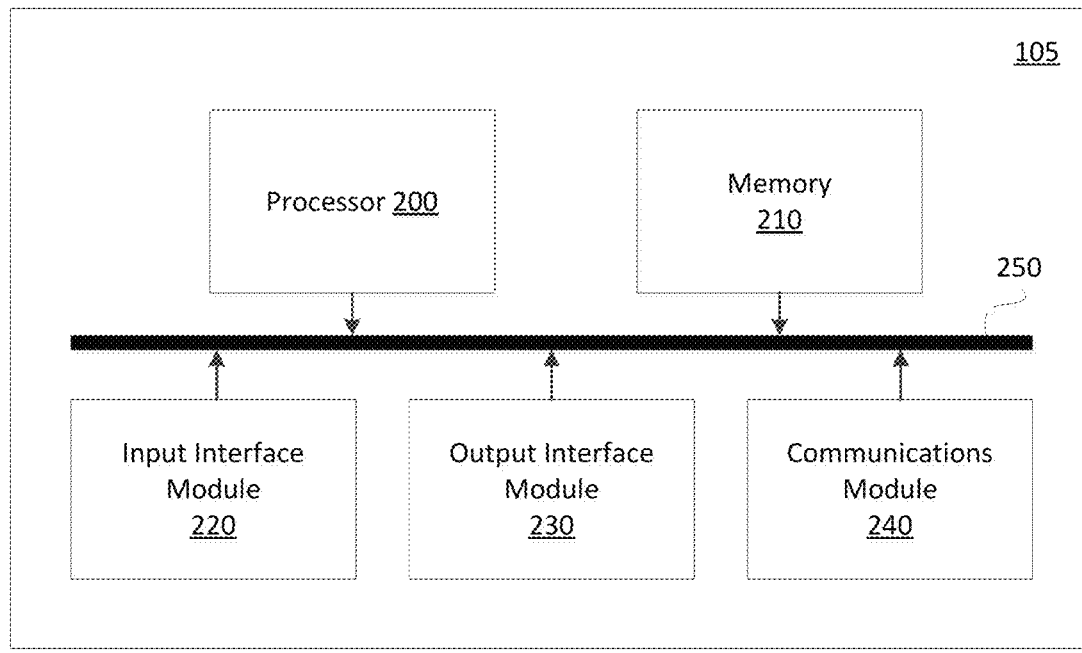
FIG. 2 is a high-level schematic diagram of an example computing device.

FIG. 2 is a high-level operation diagram of the example computing device 105. In some embodiments, the example computing device 105 may be exemplary of one or more of the client devices 110, the resource server 140, and the third-party media source server 180. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. The processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned exemplary input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by an output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. The communications module 240 may allow the example computing device 105 to communicate using near-field communication (NFC), via Wi-Fi™, using Bluetooth™ or via some combination of one or more networks or protocols. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 3:
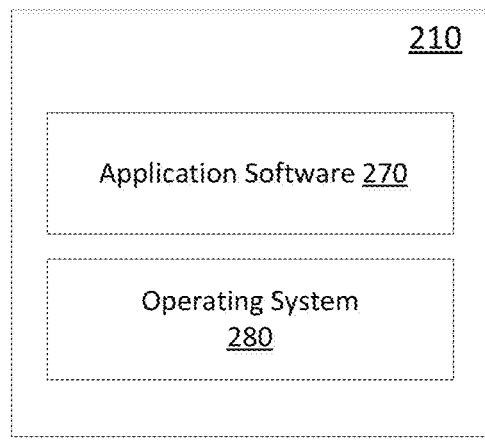
FIG. 3 shows a simplified organization of software components stored in memory of the example computing device of FIG. 2.

FIG. 3 depicts a simplified organization of software components stored in memory 210 of the example computing device 105. As illustrated these software components include an operating system 280 and an application 270.

The operating system 280 is software. The operating system 280 allows the application 270 to access the processor 200, the memory 210, the input interface module 220, the output interface module 230 and the communications module 240. The operating system 280 may be, for example, Apple's iOS™, Google's Android™, Linux™, Microsoft's Windows™, or the like.

The application 270 adapts the example computing device 105, in combination with the operating system 280, to operate as a device performing particular functions. For example, the application 270 may cooperate with the operating system 280 to adapt a suitable embodiment of the example computing device 105 to operate as the client device 110, the resource server 140, the application evaluation server 170, and the media source server(s) 180.

While a single application 270 is illustrated in FIG. 3, in operation, the memory 210 may include more than one application 270, and different applications 270 may perform different operations. For example, in embodiments where the computing device 105 is functioning as a client device 110, the application 270 may comprise a value transfer application which may, for example, be a personal banking application. The value transfer application may be configured for secure communications with the resource server 140 and may provide various banking functions such as, for example, display of account balances, transfers of value (e.g. bill payments, money transfers), and other account management functions.

Online media platforms which stream video content are known. Such platforms generally provide access to a catalogue of videos and allow playback of videos when requested by a user. Videos are generally shown in isolation, for example, in a customized video player interface for the platform. Users can view a video and manage playback controls for the video. However, real-time interactions with the video are otherwise limited. That is, operations which may be performed concurrently with playback of the video are limited. For example, if a viewer of a video wishes to search for information related to the content of the video, the viewer may be required to perform the search in a separate medium (e.g. a new browser window), which disrupts the video viewing experience. Moreover, a user-initiated search may not yield information, such as up-to-date data, news, and analysis, relating to the video content that the viewer is particularly interested in.

Figure 4:
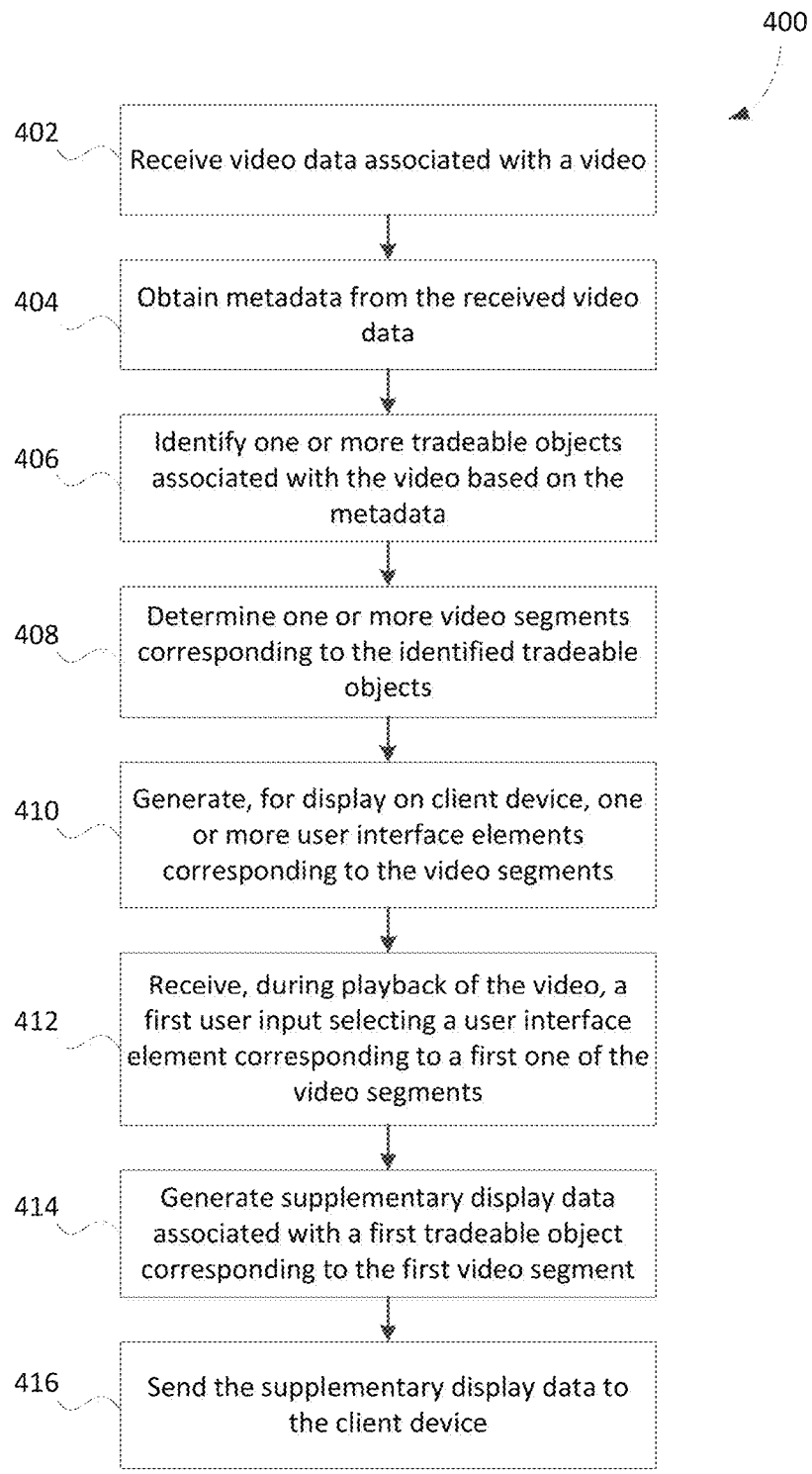
FIG. 4 shows, in flowchart form, an example method for providing video content and related supplementary data for display on a client device.

The present disclosure provides systems and methods that overcome the above-described limitations in existing video streaming technologies. Reference is made to FIG. 4, which shows, in flowchart form, an example method 400 for providing video content and related supplementary data for display on a client device. The operations of method 400 may be performed as part of the functionalities of an online media platform. An online media platform may provide access to a catalogue of videos and live streams which can be viewed on-demand. The method 400 may be incorporated into the video content display mechanism for such online media platforms.

Operations 402 and onward may be performed by one or more processors of a computing device such as, for example, the processor 200 (FIG. 2) of one or more suitably configured instances of the example computing device 105 (FIG. 2). In at least some embodiments, the method 400 may be performed by a server system. In particular, a server (such as resource server 140, in some embodiments) which provides an online media platform for accessing a catalogue of videos and which is communicably connected to one or more client devices may perform all of part of the operations of method 400. In some embodiments, a server may perform the operations of method 400 in conjunction with a resource management application server (e.g. a back-end server associated with a resource management application).

In operation 402, the server receives video data associated with a video from a media data source. The video data may be in the form of, for example, live broadcast video feeds, pre-recorded video streams, or video files. The server receives the video data via network connections established with one or more media data sources, such as media sources servers. The video data may be received as a response to user-initiated actions on an online media platform. For example, a user may input, via their client device, a selection of a video in a catalogue of videos on the online media platform. Upon receiving the user input, the server may send a request to a media source server associated with the selected video in order to obtain video content data for the selected video.

After receiving the video content data, the server obtains metadata associated with the video, in operation 404. The video metadata may include various different types of information regarding the video, such as title, description, duration, size, bitrate/compression, frame rate, display resolution, and tags (or meta tags). The video metadata includes text associated with the video content. In some embodiments, the video data may include a separate audio stream and/or closed-captioning text file that is associated with video content stream. An audio stream may, for example, comprise a bitstream containing audio data that corresponds to speech uttered by persons depicted in the video content stream. A closed-captioning text file may include alphanumeric text corresponding to speech uttered by persons depicted in the video content stream.

In operation 406, the server identifies one or more tradeable objects associated with the video based on the metadata. In particular, the server analyzes the text (e.g. closed-captioning) associated with the video content to determine whether the text contains indications of identities of one or more tradeable objects. For example, the server may identify names of securities (e.g. common stock or bonds issued by a company), commodity types, etc. that are mentioned in the video, based on analyzing the text associated with the video content. In some embodiments, the server may reference one or more lists of identifiers of tradeable objects, and perform textual comparison in order to identify tradeable objects that are associated with the video. For example, the server may obtain a list of tradeable objects that are included in a portfolio associated with a user, and determine whether the text associated with the video content contains any of the listed tradeable objects. As another example, the server may reference a publicly available list, such as a stock market index, and determine whether any of the listed tradeable objects are mentioned in the text associated with the video content.

In operation 408, the server determines one or more segments of the video that correspond to the identified tradeable objects. A video segment refers a portion of the video content that has a fixed start time and a fixed end time, i.e. a video segment has a fixed duration. In particular, each video segment has a playback start timestamp. In some embodiments, the playback start timestamps of one or more video segments may be indicated in the metadata for the video. For example, the metadata may indicate the start timestamps of video segments corresponding to a plurality of different topics which are covered in the video content. The metadata may include, for example, identifiers of one or more topics and the playback start timestamps associated with the topics. The server may then determine which of the segments indicated in the metadata correspond to the tradeable objects identified from the text associated with the video content. In some embodiments, the server may store, in memory, details of the one or more tradeable objects that are identified based on the video metadata and the playback start timestamps of video segments corresponding to the identified tradeable objects.

The segmentation of the video content may be performed manually, and the metadata for the video may include a representation of the segmentation. In particular, the video segmentation may be done manually prior to playback of the video on the online media platform. Additionally, or alternatively, the segmentation may be performed automatically based on, for example, textual analysis of the text associated with the video content. For example, a computing system may process the video data, including video content and audio streams associated with the video, and perform textual analysis of the video data to identify segments of the video which pertain to different topics.

In operation 410, the server generates, for display on a client device, one or more user interface elements corresponding to the video segments. In at least some embodiments, the user interface elements may be labels or buttons that include identifying information for the topics corresponding to the video segments. For example, a plurality of buttons/icons which are labeled using symbols (e.g. ticker symbols) associated with the tradeable objects corresponding to the video segments may be generated. The user interface elements are selectable to initiate playback of the respective video segments. That is, a video segment may be played back when the user interface element that corresponds to the video segment is selected, for example, by a user input.

The user interface elements are displayed on the client device concurrently with playback of the video. In particular, the user interface elements are displayed at positions that correspond to their respective playback start timestamps. For example, a playback interface for videos on an online media platform may display a playback control bar. The user interface elements may be displayed at positions along the playback control bar that correspond to the start times of the respective video segments.

In operation 412, the server receives, via the client device during playback of the video, a user input selecting one of the user interface elements that corresponds to a first one of the video segments. In response to receiving the user input, the server generates supplementary display data associated with a tradeable object corresponding to the first video segment, in operation 414. In at least some embodiments, the supplementary display data includes graphical user interface data associated with the tradeable object corresponding to the first video segment, for displaying on the client device. For example, the supplementary display data may include information, such as news, analysis, etc., about the tradeable object that is featured in the first video segment.

In generating the supplementary display data, the server may obtain information relating to the tradeable object from third-party data sources. For example, the server may query one or more databases to retrieve data associated with the tradeable object, and generate the display data based on the retrieved data. As a further example, the server may be configured to receive real-time data (e.g. price data) in connection with the tradeable object from various third-party services.

In some embodiments, the supplementary display data associated with the identified tradeable objects may be stored by the server. More particularly, the server may store, in memory, supplementary display data, obtained from third-party sources, in association with identifying information (e.g. name, ticker symbol, etc.) for the respective tradeable objects. The server may also be configured to retrieve the most current data associated with the identified tradeable objects. In some embodiments, the server may determine that current data associated with at least one of the identified tradeable objects is different from supplementary display data that is stored in association with the at least one identified tradeable object in memory. Upon determining that the stored data may be out-of-date, the server may update the memory to store current data associated with the at least one identified tradeable object. In this way, the server may maintain up-to-date information relating to the tradeable objects that are identified in the videos available on the online media platform, and can provide the up-to-date information to client devices for display along with the videos.

The supplementary display data generated by the server is then sent to the client device, in operation 416, and displayed on the client device. The supplementary display data may be displayed concurrently with playback of the video. In particular, the supplementary display data may be displayed on a same user interface as the video playback. A user can view the video and the supplementary display data on a same page of the user interface when the video is being played back. In this way, the video content and supplementary information associated with the topics that are covered by the video content can be viewed concurrently on the same page.

Figure 8A:
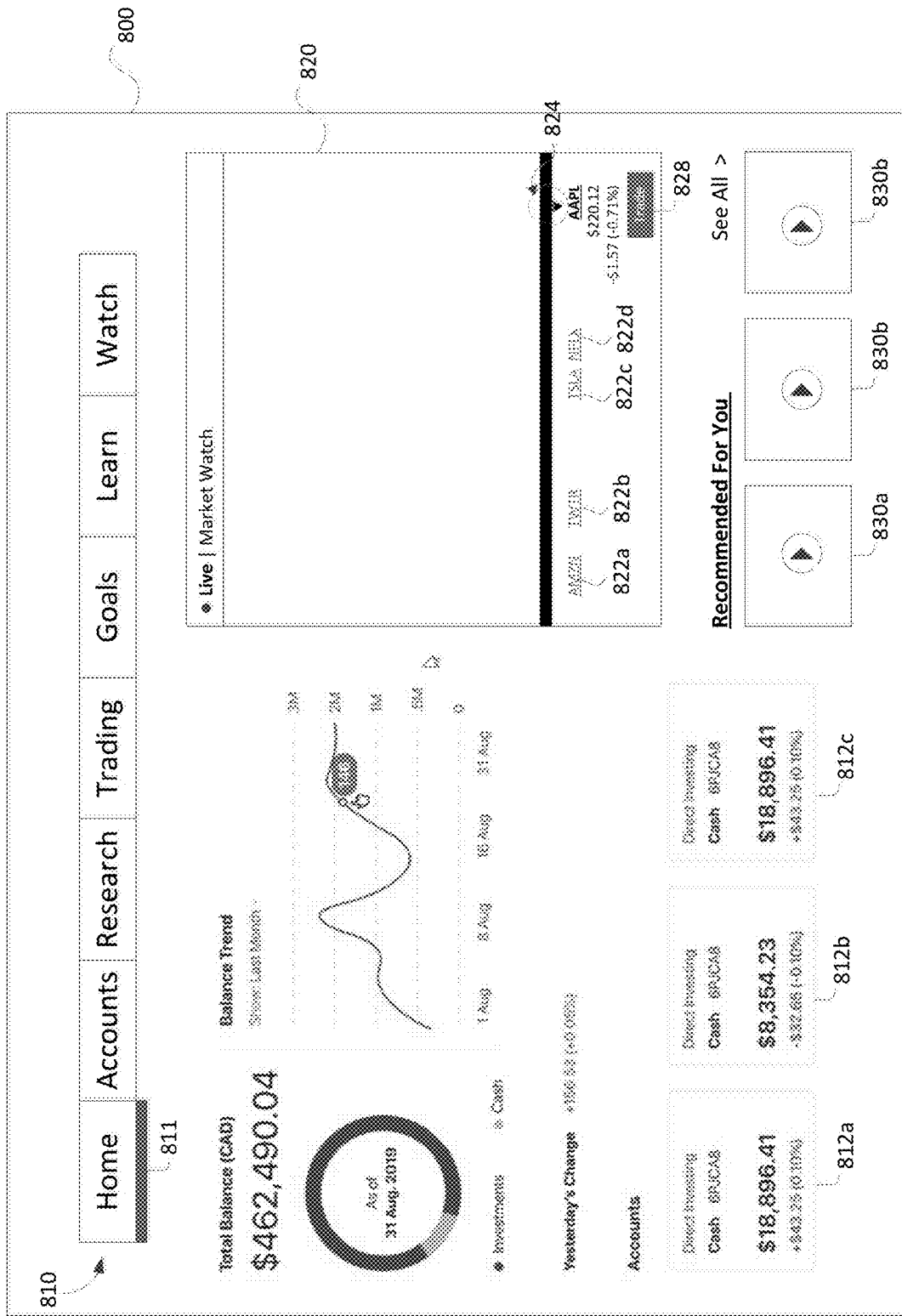
FIGS. 8A to 8C show example pages of a graphical user interface for accessing customized video content, in accordance with example embodiments of the present disclosure.
Figure 8B:
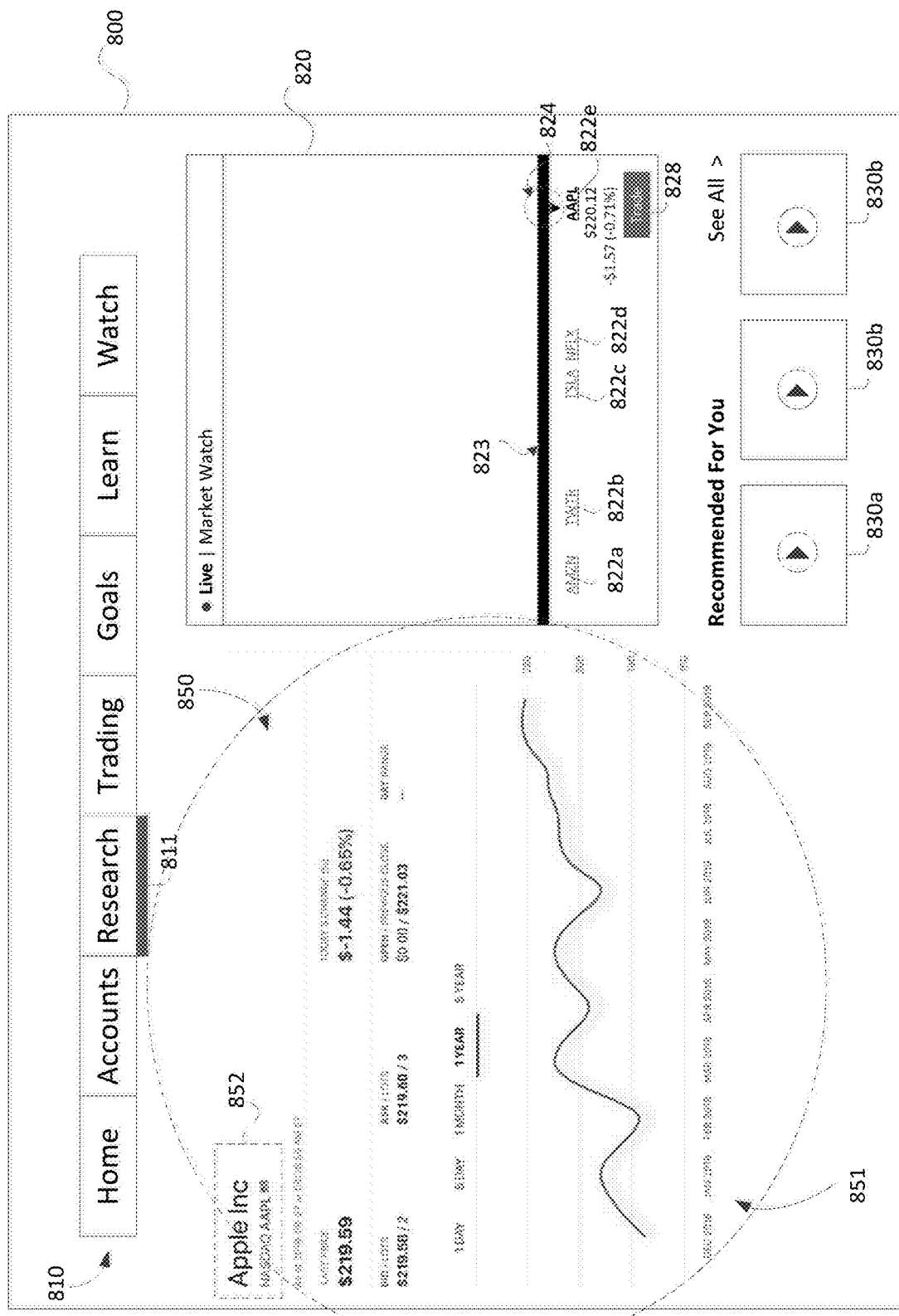

Reference is made to FIGS. 8A and 8B, which show an example user interface 800 for a resource management application. The user interface 800 may allow users to perform various actions relating to management of their resources, such as financial resources (e.g. cash, investments, etc.). The user interface 800 includes a navigation bar 810 and a plurality of user interfaces 811 corresponding to different pages of the user interface 800. A "Home" page of the user interface is shown in FIG. 8A. The "Home" page may provide a summary of a user's financial information, such as total balance, balance trends, and account data for one or more different accounts 812a-812c.

The "Home" page, as well as other pages of the user interface 800, may include media content. A video playback interface 820 is shown in FIGS. 8A and 8B. This video playback interface 820 may play videos that are available on the resource management application. For example, videos that are selected by users via the user interface 800 may be shown in the video playback interface 820. Additionally, or alternatively, videos may be selected automatically and begin playing in the video playback interface 820 when a user lands on the "Home" (or other) page of the user interface 800. The user interface 800 may also present additional, or recommended, videos 830a-830c for viewing by a user of the resource management application.

FIG. 8B shows a "Research" page of the user interface 800. The "Research" page may allow users to conduct research on resources which may be managed via the resource management application. The video playback interface 820 and supplementary display data 850 are both displayed on the "Research" page. In the example of FIG. 8B, the supplementary display data 850 is displayed in a supplementary display data 851 that is immediately adjacent to the video playback interface 820. As shown in FIG. 8B, the video playback interface 820 may include numerous different graphical components. The video playback interface 820 includes a progress bar 823 and a progress indicator 824. The progress indicator 824 graphically represents the current position of the video playback. Accordingly, the progress indicator 824 moves along the progress bar 823 when the video is being played.

The video playback interface 820 also includes a plurality of user interface elements 822a-822e which correspond to one or more video segments. In the example of FIG. 8B, the user interface elements 822a-822e are labels which identify the names of one or more tradeable objects corresponding to video segments. In particular, the user interface elements 822a-822e represent the topics which are covered in the video segments. The user interface elements 822a-822e are positioned along the progress bar 823 such that they correspond to the positions of their respective video segments. For example, the user interface elements 822a-822e may be positioned at a start position of their respective video segments.

When a user selects one of the user interface elements 822a-822e, the corresponding video segment may begin playing in the video playback interface 820. The supplementary display data associated with the tradeable object corresponding to the selected video segment may simultaneously be generated by the server. For example, if a user selects the user interface element 822e (labelled "AAPL"), the progress indicator 824 may move to the start position of the video segment corresponding to the tradeable object, i.e. stock with the ticker symbol "AAPL". The supplementary display area 851 of the user interface 800 may be populated with supplementary display data 850 relating to the stock "AAPL". The supplementary display data 850 may include, for example, identifier 852 of the stock, current price information, and graphical representations of trends in the price of the stock.

Figure 5:
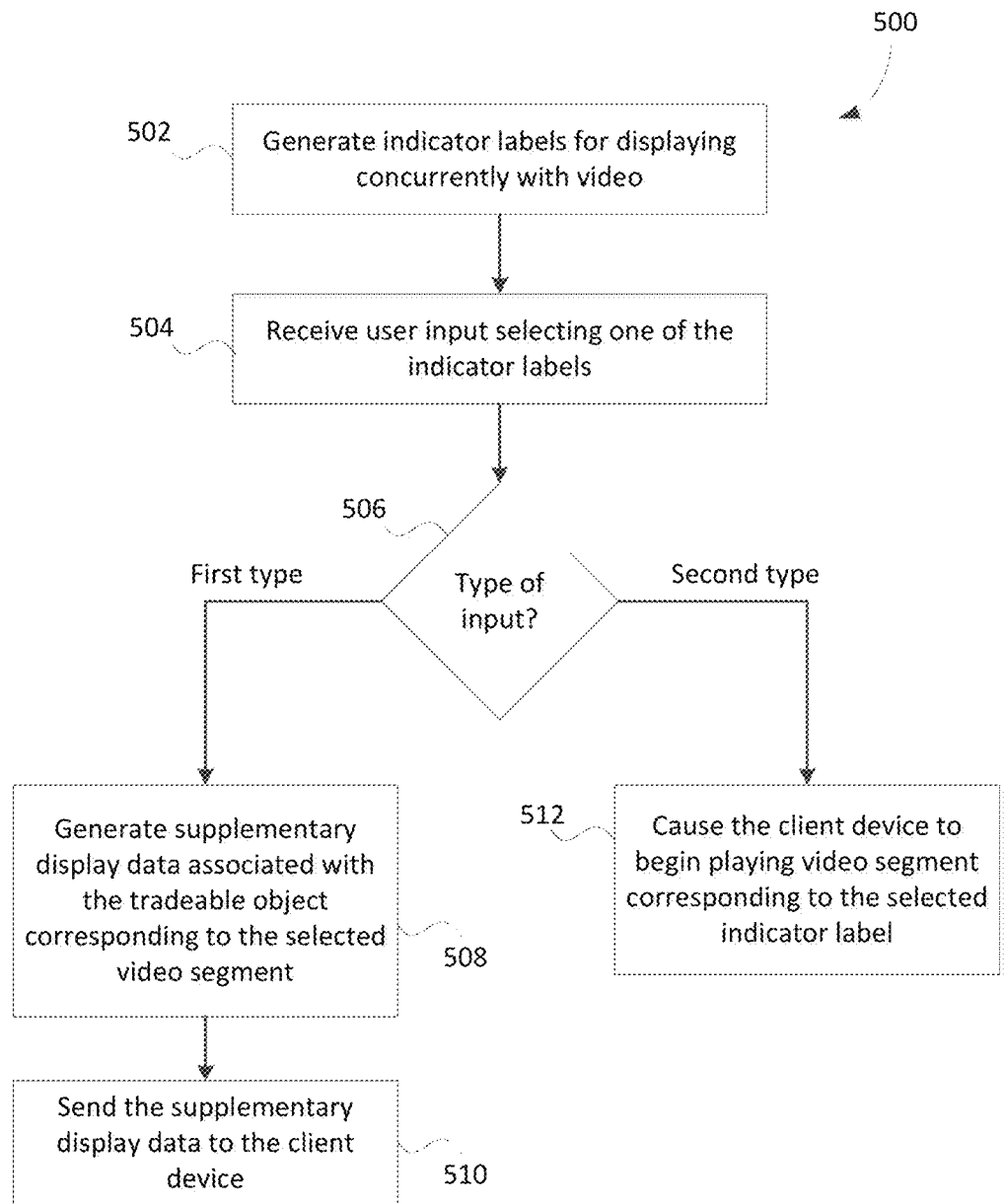
FIG. 5 shows, in flowchart form, another example method for providing video content and related supplementary data for display on a client device.

Reference is made to FIG. 5, which shows, in flowchart form, an example method 500 for providing video content and related supplementary data for display on a client device. The operations of method 500 may be performed as part of the functionalities of an online media platform. For example, the method 500 may be incorporated into the video content display mechanism for an online media platform.

Operations 502 and onward may be performed by one or more processors of a computing device such as, for example, the processor 200 (FIG. 2) of one or more suitably configured instances of the example computing device 105 (FIG. 2). In at least some embodiments, the method 500 may be performed by a server system. In particular, a server (such as resource server 140, in some embodiments) which provides an online media platform for accessing a catalogue of videos and which is communicably connected to one or more client devices may perform all of part of the operations of method 500. The operations of method 500 may be performed in addition to, or as alternatives, to one or more of the operations of method 400 described above.

In operation 502, the server generates indicator labels for displaying concurrently with playback of a video. The indicator labels are associated with video segments that correspond to one or more tradeable objects identified from the metadata of the video, as in operation 406 of method 400. In particular, the indicator labels describe the topics that are represented by the content of the respective video segments. Other user interface elements, such as buttons, icons, etc., may be used in place of indicator labels for the purpose of identifying the video segments.

In operation 504, the server receives user input selecting one of the indicator labels. Specifically, the server receives, via a client device during playback of the video, a user input selecting an indicator label. In response to receiving the user input, the server determines a type associated with the input, in operation 506. If the server determines that the user input is of a first predetermined type (e.g. double-click), the server causes the client device to display relevant supplementary display data. In particular, the server may generate supplementary display data associated with the tradeable object corresponding to the selected video segment, in operation 508, and send the supplementary display data to the client device, in operation 510, for display on the client device.

Otherwise, if the user input is determined to be of a second predetermined type (e.g. single click), the server causes the client device to begin playing the video segment corresponding to the selected indicator label, without generating any supplementary display data. More generally, the playback of video segments and the display of supplementary display data associated with the video segments may be independently controlled, by using different inputs.

In some embodiments, the user interface elements associated with video segments corresponding to the one or more tradeable objects that are identified in a video may be updated during playback of the video. For example, as a progress indicator moves along during playback of a video, when the progress indicator coincides with a position of one of the user interface elements associated with the video segments, the user interface element may be highlighted. That is, the display of the user interface element corresponding to a current playback position of the video may be updated during playback of the video.

Figure 6:
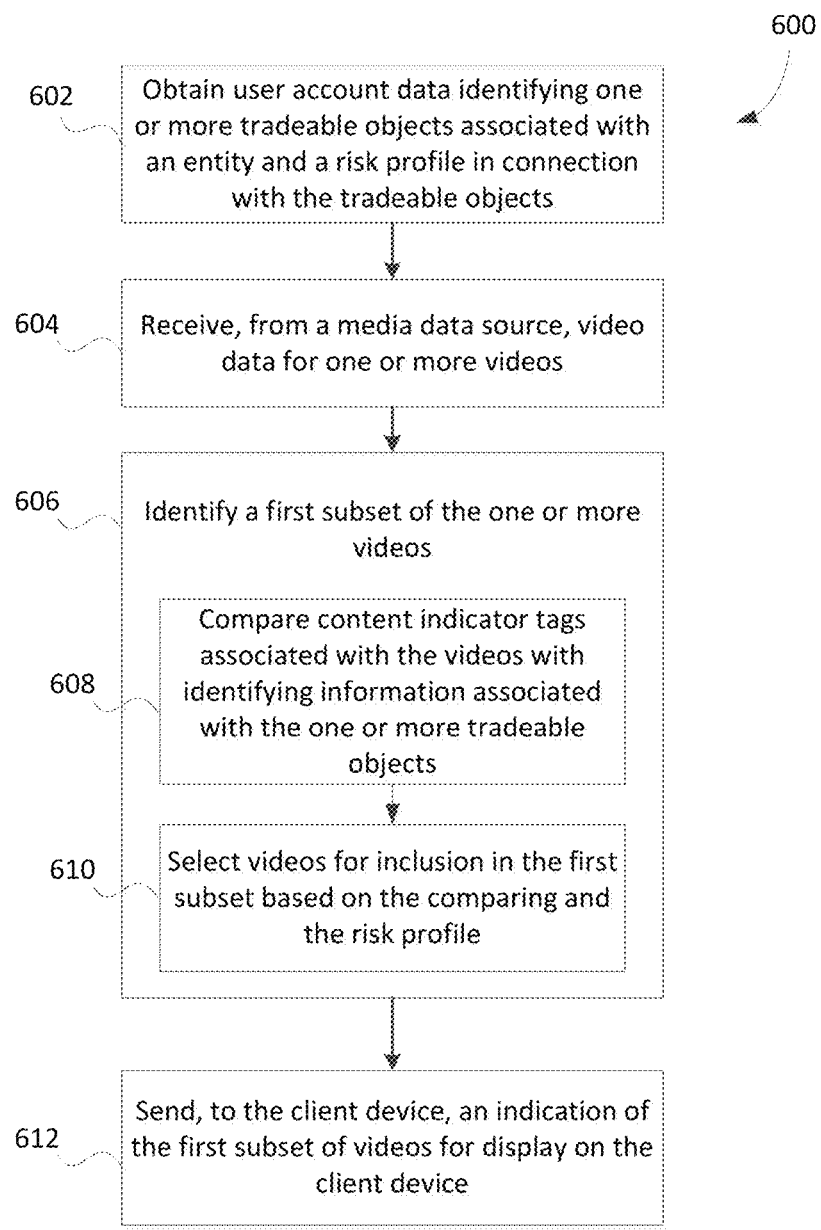
FIG. 6 shows, in flowchart form, an example method for providing customized video content for consumption via an online media platform.

Reference is made to FIG. 6, which shows, in flowchart form, an example method 600 for providing customized video content for consumption via an online media platform. The operations of method 600 may be performed as part of the functionalities of an online media platform. In particular, the method 600 may be included in a mechanism for curating video content to present on an online media platform. For example, the method 600 may be employed in curating personalized recommendations for videos for users of an online media platform.

Operations 602 and onward may be performed by one or more processors of a computing device such as, for example, the processor 200 (FIG. 2) of one or more suitably configured instances of the example computing device 105 (FIG. 2). In at least some embodiments, the method 600 may be performed by a server system. In particular, a server (such as resource server 140, in some embodiments) which provides an online media platform for accessing a catalogue of videos and which is communicably connected to one or more client devices may perform all of part of the operations of method 600.

In operation 602, the server obtains user account data identifying one or more tradeable objects associated with an entity and a resource allocation profile in connection with the one or more tradeable objects. The user account data may be provided by a user of the online media platform. For example, a user may input account data, specifying one or more tradeable objects associated with the user, when creating an account in a resource management application that integrates an online media platform. In some embodiments, the server may query a database containing portfolio data for one or more users of the online media platform to identify the one or more tradeable objects associated with the user. For example, the server may retrieve, from a portfolio database, identities of tradeable objects which are contained in a virtual portfolio associated with the user. The resource allocation profile may, in some embodiments, be an investment risk profile. The investment risk profile may indicate a risk tolerance associated with the entity for at least one of the tradeable objects in the virtual portfolio.

In operation 604, the server receives, from at least one media data source, video data for one or more videos. The videos may be obtained from one or more media source servers. In at least some embodiments, the server may obtain the video data upon requesting for transmission of the video data from the media source servers hosting the videos. The video data for videos obtained by the server include content indicator tags associated with the videos. For example, the video data may include metadata defining one or more content indicator tags. The content indicator tags are representations of the content of the videos. In at least some embodiments, the content indicator tags may be textual representations, such as content descriptors, keywords, etc. of the video content.

In operation 606, the server identifies a first subset of the one or more videos, to present to a user associated with the account data. Various techniques may be employed for selecting a subset of the plurality of videos received by the server. In accordance with embodiments of the present disclosure, the server selects videos based on information relating to one or more tradeable objects that are associated with the particular user of the online media platform. In operation 608, the server compares the content indicator tags associated with the one or more videos with identifying information associated with the one or more tradeable objects. In particular, the server may be configured to identify matches between content indicator tags associated with at least one of the videos and identifying information (e.g. company name, ticker symbol, industry, etc.) associated with tradeable objects which are represented in the videos. For example, the server may perform textual comparison between the content indicator tags and identifiers associated with the tradeable objects.

In operation 610, the server selects videos based on the comparisons performed in operation 608 and based on the resource allocation profile associated with the particular user. In at least some embodiments, for each of one or more of the videos, the server may maintain a count of matches (e.g. textual matches) between the content indicators tags for the video and the identifiers associated with the video. A high count of matches may suggest that a particular video contains a substantial amount of content that is relevant for a user associated with the tradeable objects identified in the account data. Accordingly, the selected subset of videos may include a predefined number of videos that have the highest count of matches during the comparison operation.

The resource allocation profile associated with the user may indicate the types and/or the user's investment preferences associated with the tradeable objects identified in the account data. For example, the resource allocation profile may specify various information about the user and their investment activities/preferences, including: short-term trading versus long term holding; risk-averse or risk tolerant; classes of assets/tradeable objects; investment strategies; and valuation methods. A resource allocation profile may inform the selection of videos which may be suitable for a particular user of an online media platform. In particular, the server may, in operation 610, use various criteria defined in a resource allocation profile to identify in real-time those videos which are most relevant to the user. For example, the server may select only those videos which have a high number of matches between content indicators of videos and identifiers associated with tradeable objects that are determined to be short-term holds based on the resource allocation profile. That is, the definitions in the resource allocation profile may be used as filters for the selection of videos in operation 610.

In operation 612, an indication of the selected subset of videos is then sent to the client device for display in a user interface on the client device. The indication may be used, for example, by the client device in automatically presenting the selected subset of videos in a graphical user interface associated with the online media platform.

The selection of videos for presenting in the online media platform may be updated dynamically. In some embodiments, the server may update recommendations of videos based on changes to a user's virtual portfolio. For example, the server may detect a change in a virtual portfolio associated with a user and in response to detecting the change, the server may identify a different subset of videos to recommend to the user. An indication of the new subset of videos may then be sent to the client device for display in a user interface on the client device.

Figure 8C:
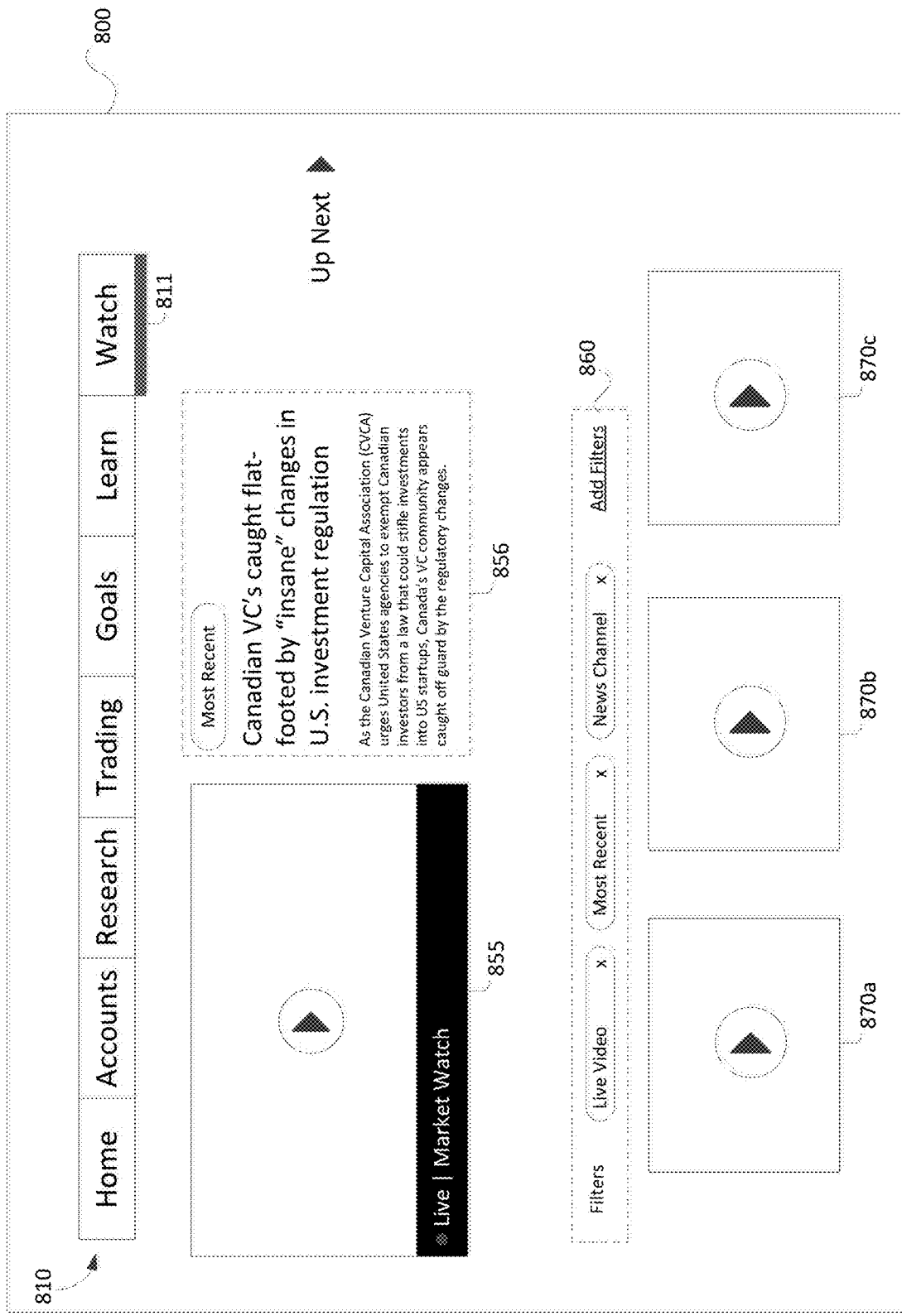

A "Watch" page of the user interface 800 is shown in FIG. 8C. The "Watch" page may present videos which are recommended for a particular user of the resource management application. The videos may be selected, at least in part, based on a mechanism that includes the method 600 for providing customized video content for consumption. In FIG. 8C, the user interface 800 includes a video playback interface 855, a video description area 856, and videos 870*a*-870*c* for presenting to a user of the online media platform. The user interface 800 also includes a plurality of user interface elements in a video filter area 860 for allowing users to select one or more filter criteria. The selected filter criteria may be applied in presenting the videos which are most relevant for a particular user. For example, the filter criteria may be applied to further narrow the subset of videos which are selected for the user by the content curation mechanism described in the present disclosure.

Figure 7:
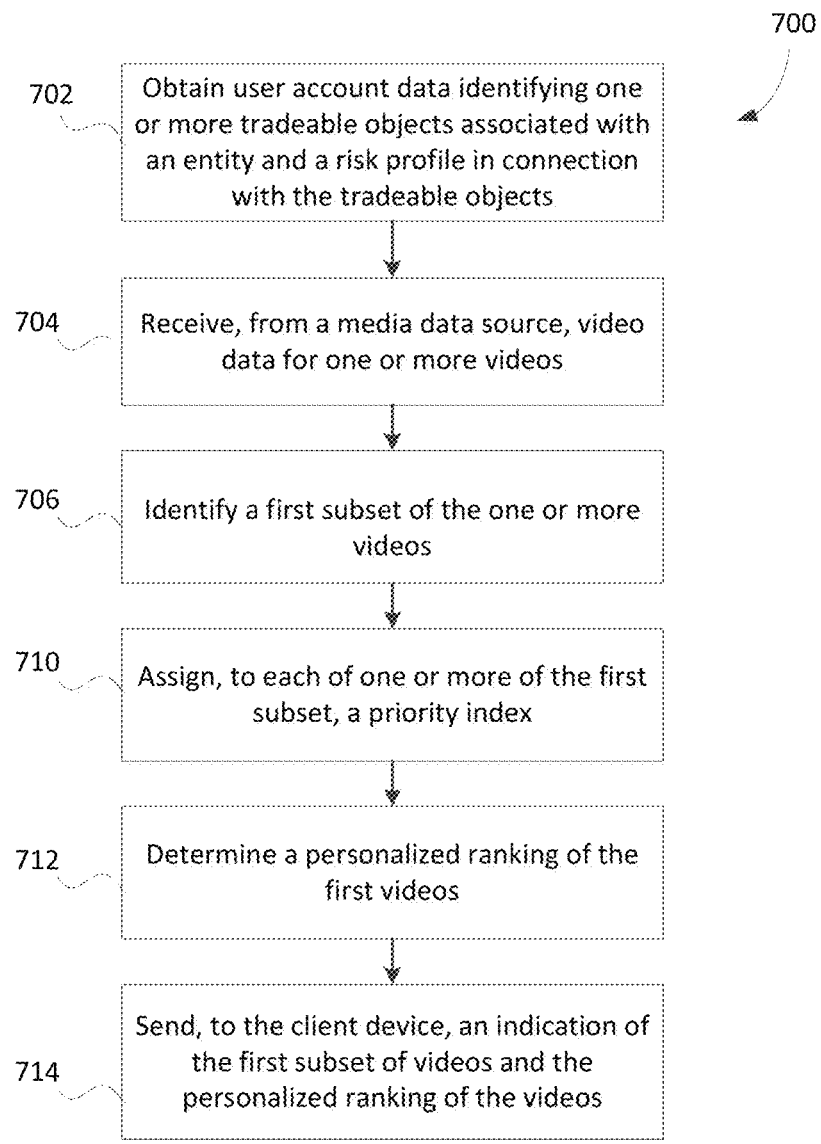
FIG. 7 shows, in flowchart form, another example method for providing customized video content for consumption via an online media platform.

Reference is made to FIG. 7, which shows, in flowchart form, an example method 700 for providing customized video content for consumption via an online media platform. The operations of method 700 may be performed as part of the functionalities of an online media platform. In particular, the method 700 may be included in a mechanism for curating video content to present on an online media platform.

Operations 702 and onward may be performed by one or more processors of a computing device such as, for example, the processor 200 (FIG. 2) of one or more suitably configured instances of the example computing device 105 (FIG. 2). In at least some embodiments, the method 700 may be performed by a server system which provides an online media platform. The operations of method 700 may be performed in addition to, or as alternatives, to one or more of the operations of method 600 described above.

Operations 702, 704 and 706 correspond to operations 602, 604 and 606 of method 600, respectively, and may be performed in a similar manner as those operations. In operation 710, the server assigns, to at least one of the videos of the selected subset, a priority index. The priority index represents a priority of displaying the at least one video in a listing of videos on the client device. That is, the priority indices may inform the presentation of videos, as each video may be presented according to its priority index to users of the online media platform. In at least some embodiments, the priority indices may be determined based on the comparison of content indicator tags associated with the videos of the subset and information associated with the tradeable objects identified by the user account data. For example, a higher priority index may be assigned to a video having a high count of matches in the comparison of the content indicator tags to the tradeable objects information.

In operation 712, the server determines a personalized ranking of the videos of the selected subset. The personalized ranking may be determined based on the priority indices associated with the videos of the subset. For example, the personalized ranking may reflect the ranking of priority indices (i.e. highest to lowest index values) for the videos.

As an extension, in some embodiments, the server may compute relevance scores for one or more videos when selecting videos for presenting to particular users of the online media platform. For example, the server may compute relevance scores which measure similarity between the content indicator tags and the information associated with the one or more tradeable objects identified in the user account data. The selection of videos may then proceed based on the computed relevance scores.

In some embodiments, the server may update the recommendations of videos based on receiving video data for new videos (or videos previously unavailable on the online media platform). For example, the server may receive video data for a new video and determine that a relevance score for the new video is greater than a relevance score for at least one of the videos currently included in the selected subset. The server may then send an indication of the identity of the new video and identities of the at least one video of the selected subset having a lower relevance score than the new video. In this way, the online media platform may provide those videos that are determined to have the highest relevance scores in connection with the tradeable objects associated with the particular user.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub- combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computer system, comprising:
a communications module communicable with an external network;
a memory; and
a processor coupled to the communications module and the memory, the processor being configured to:
  receive, from a media data source, video data associated with a video;
  obtain metadata from the received video data, the metadata including text associated with video content of the video;
  identify one or more tradeable objects associated with video content of the video based on performing textual comparison between the text of the metadata and a list of tradeable objects that are associated with a portfolio;
  determine one or more segments of the video corresponding to the one or more identified tradeable objects, the one or more video segments having respective playback start timestamps;
  generate, for display on a client device, one or more user interface elements corresponding to the one or more video segments, the one or more user interface elements being selectable to initiate playback of the respective video segments;
  receive, via the client device during playback of the video, a first user input selecting a user interface element corresponding to a first one of the video segments;
  in response to receiving the first user input:
    generate supplementary display data associated with a first tradeable object corresponding to the first video segment; and
    send, to the client device, the supplementary display data.

2. The computer system of claim 1, wherein the supplementary display data comprises graphical user interface data associated with the first tradeable object for displaying on the client device.

3. The computer system of claim 1, wherein generating the supplementary display data comprises:
querying a database to retrieve data associated with the first tradeable object; and
generating display data based on the retrieved data associated with the first tradeable object.

4. The computer system of claim 1, wherein the text corresponds to at least one of audio or closed captioning text associated with the video content.

5. The computer system of claim 1, wherein the processor is further configured to:
receive, via the client device during playback of the video, a second user input selecting the user interface element; and
in response to receiving the second user input, cause the client device to begin playing a video segment corresponding to the user interface element without generating the supplementary display data.

6. The computer system of claim 1, wherein the processor is further configured to store, in the memory, identities of the tradeable objects in association with playback start timestamps of their corresponding video segments.

7. The computer system of claim 6, wherein the processor is further configured to:
obtain supplementary display data associated with the identified tradeable objects; and
store, in the memory, the obtained supplementary display data in association with the identities of the respective tradeable objects.

8. The computer system of claim 7, wherein the processor is further configured to:
for at least one of the identified tradeable objects:
determine that current data associated with the at least one identified tradeable object is different from supplementary display data stored in association with the at least one identified tradeable object; and
update the memory to store the current data associated with the at least one identified tradeable object.

9. The computer system of claim 1, wherein the processor is further configured to, during playback of the video, update display of one of the user interface elements which corresponds to a current playback position of the video.

10. The computer system of claim 1, wherein the one or more user interface elements are displayed, on the client device, concurrently with the video, the one or more user interface elements being displayed at positions corresponding to their respective playback start timestamps.

11. A processor-implemented method, comprising:
receiving, from a media data source, video data associated with a video;
obtaining metadata from the received video data, the metadata including text associated with video content of the video;
identifying one or more tradeable objects associated with video content of the video based on performing textual comparison between the text of the metadata and a list of tradeable objects that are associated with a portfolio;
determining one or more segments of the video corresponding to the one or more identified tradeable objects, the one or more video segments having respective playback start timestamps;
generating, for display on a client device, one or more user interface elements corresponding to the one or more video segments, the one or more user interface elements being selectable to initiate playback of the respective video segments;
receiving, via the client device during playback of the video, a first user input selecting a user interface element corresponding to a first one of the video segments;

in response to receiving the first user input:
generating supplementary display data associated with a first tradeable object corresponding to the first video segment; and
sending, to the client device, the supplementary display data.

12. The method of claim 11, wherein the supplementary display data comprises graphical user interface data associated with the first tradeable object for displaying on the client device.

13. The method of claim 11, wherein generating the supplementary display data comprises:
querying a database to retrieve data associated with the first tradeable object; and
generating display data based on the retrieved data associated with the first tradeable object.

14. The method of claim 11, wherein the text corresponds to at least one of audio or closed captioning text associated with the video content.

15. The method of claim 11, further comprising:
receiving, via the client device during playback of the video, a second user input selecting the user interface element; and
in response to receiving the second user input, causing the client device to begin playing a video segment corresponding to the user interface element without generating the supplementary display data.

16. The method of claim 11, further comprising storing, in a memory, identities of the tradeable objects in association with playback start timestamps of their corresponding video segments.

17. The method of claim 16, further comprising:
obtaining supplementary display data associated with the identified tradeable objects; and
storing, in the memory, the obtained supplementary display data in association with the identities of the respective tradeable objects.

18. The method of claim 17, further comprising:
for at least one of the identified tradeable objects:
determining that current data associated with the at least one identified tradeable object is different from supplementary display data stored in association with the at least one identified tradeable object; and
updating the memory to store the current data associated with the at least one identified tradeable object.

19. The method of claim 11, further comprising, during playback of the video, updating display of one of the user interface elements which corresponds to a current playback position of the video.

20. The method of claim 11, wherein the one or more user interface elements are displayed, on the client device, concurrently with the video, the one or more user interface elements being displayed at positions corresponding to their respective playback start timestamps.

* * * * *